(12) United States Patent
Zimmer

(10) Patent No.: US 6,883,972 B2
(45) Date of Patent: Apr. 26, 2005

(54) FIBER-TO-FIBER COUPLING USING INTERFERENCE TO MINIMIZE POWER LOSS

(75) Inventor: Gregory C. Zimmer, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 138 days.

(21) Appl. No.: 10/351,175

(22) Filed: Jan. 24, 2003

(65) Prior Publication Data

US 2004/0146249 A1 Jul. 29, 2004

(51) Int. Cl.$^7$ .................................................. G02B 6/38
(52) U.S. Cl. ............................ 385/55; 385/59; 385/71
(58) Field of Search ............................. 385/55, 58, 59, 385/70, 71, 76, 86, 73, 140

(56) References Cited

U.S. PATENT DOCUMENTS

| | | | | |
|---|---|---|---|---|
| 4,516,828 A | * | 5/1985 | Steele | 385/24 |
| 4,519,671 A | * | 5/1985 | Curtis et al. | 385/140 |
| 4,946,236 A | * | 8/1990 | Dautartas et al. | 385/17 |
| 5,066,094 A | * | 11/1991 | Takahashi | 385/73 |
| 5,127,084 A | * | 6/1992 | Takahashi | 385/140 |
| 5,319,733 A | * | 6/1994 | Emmons et al. | 385/140 |
| 5,727,099 A | * | 3/1998 | Harman | 385/140 |
| 5,940,547 A | * | 8/1999 | Schumacher et al. | 385/12 |
| 6,363,203 B1 | * | 3/2002 | Dautartas | 385/140 |
| 6,628,882 B2 | * | 9/2003 | Vaganov et al. | 385/140 |

OTHER PUBLICATIONS

Venkatesh, Shalini et al., "Insertion Loss Reduction By Optimization of Waveguide Perturbations," OFC 2002 Post-deadline Papers, FA4–1—FA4–3 (2002).

Copy of U.S. patent application No. 10/027,498 filed on Dec. 21, 2001 entitled "A Method And Apparatus For Reducing Optical Insertion Loss in Planar Lightwave Circuits Through Dielectric Perturbation Optimization".

* cited by examiner

Primary Examiner—Michael G. Lee
Assistant Examiner—Uyen-Chau N. Le

(57) ABSTRACT

An optical fiber coupling reduces power loss by creating breaks in one or both of the optical fibers being joined so that destructive interference between modes of the signal escaping at the coupling and the breaks reduces total power loss. The breaks can be in the receiving and/or transmitting optical fiber, and each break generally correspond to a small region of changed refractive index in the cladding and/or core of an optical fiber. The breaks can be created using a laser or by removal and replacement of small regions of cladding material. An active alignment process can position the optical fibers for physical attachment.

15 Claims, 3 Drawing Sheets

FIBER-TO-FIBER COUPLING USING INTERFERENCE TO MINIMIZE POWER LOSS

BACKGROUND

Optical fibers can carry light signals for great distances without significant loss. Light losses, however, can be significant at a fiber-to-fiber coupling, where two optical fibers are joined. A variety of optical fiber-to-fiber coupling systems have been developed. One class of optical coupling systems uses optical elements such as lens pairs between the ends of the optical fibers. The optical elements collect the light emitted from the source optical fiber and focus the light on the core of the receiving optical fiber. For a high efficiency at coupling optical power into the receiving optical fiber, the focused light needs to be at the proper angles for transmission along the core of the receiving optical fiber. The intervening optical elements can achieve a high coupling efficiency but increase the cost and alignment difficulties involved in creating a fiber-to-fiber coupling.

Butt coupling provides a simple fiber-to-fiber coupling in which the ends of two optical fibers are adjacent to or in contact with each other. This type of fiber-to-fiber coupling is typically made with a tool that adjoins the ends, aligns the optical fibers, and then attaches a physical coupling device and/or adhesive meant to hold the two optical fibers in the established alignment. Several types of errors or differences in the fiber-to-fiber couplings can cause power loss.

One source of power loss is defects in the end faces of the optical fibers. For optimal coupling efficiency the end faces of each optical fiber must be perpendicular to the length of the fiber and free of defects such as chips or roughness.

Another source of power loss in fiber-to-fiber couplings is misalignment of the optical fibers. FIG. 1A, for example, illustrates an example where the centers of the cores 110A and 110B of optical fibers 100A and 100B are offset from each other. FIG. 1B illustrates optical fibers 100A and 100B having an angular misalignment, and FIG. 1C illustrates optical fibers separated by too large of a gap 120. Such alignment errors are inherent in mechanical alignment techniques and result in signal loss. This signal loss can be reduced or minimized using an active alignment procedure that measures the optical power coupled into the receiving optical fiber and adjusts the position and orientation of the optical fibers to maximize power coupling efficiency.

Intrinsic differences in properties of the two optical fibers being coupled are yet another source of power loss in a fiber-to-fiber coupling. FIG. 1D illustrates optical fibers 100A and 100B that have different numerical apertures so that a portion of the light signal from transmitting fiber 100A is at angles that cannot be coupled into receiving fiber 100B. FIG. 1E illustrates a situation where optical fibers 100A and 100B have cores 110A and 110B with different diameters so that less than the full cross-section of the optical signal from the transmitting fiber 100A can be coupled into the receiving optical fiber. Differences in the cladding diameter (as illustrated in FIG. 1F) or differences in the diffractive index profiles of the optical fibers 100A and 100B (as illustrated in FIG. 1G) can result in similar power loss at the optical coupling. This type of power loss is inherent to the optical fibers' properties and variations and is present even if the optical fibers can be ideally aligned.

In view of the current state of the art, optical coupling structures and methods are sought that can reduce optical power loss at the couplings of optical fibers. Such structures and methods would ideally reduce power losses regardless of whether misalignment or differences in the properties of the optical fibers caused the power losses.

SUMMARY

In accordance with an aspect of the invention, a portion of a receiving optical fiber and/or a transmitting optical fiber is patterned to include discontinuities or breaks. Resulting signal leakages at the end face of the transmitting fiber and from the breaks destructively interfere to reduce total signal loss and increase the power efficiency of the fiber-to-fiber coupling. The patterning of the optical fibers can include discontinuities or breaks in the cladding and/or the cores of one or both of the optical fibers.

One specific embodiment of the invention is an optical device such as an optical coupling for a pair of optical fibers. The ends of the optical fibers are positioned so that one optical fiber transmits an optical signal into the other optical fiber. One or both of the optical fibers includes one or more breaks. Each break in an optical fiber is a change in the refractive index of the core or the cladding of the optical fiber, and the one or more breaks are positioned so that the optical signal escaping at the breaks interferes with the optical signal escaping between the ends of the optical fibers. The interference reduces the total power loss in the optical device.

Another embodiment of the invention is a process for coupling optical fibers. The process begins by treating a first optical fiber to create one or more breaks near an end of the first optical fiber. Optionally, a second optical fiber is similarly treated to create breaks in the second optical fiber. The patterns on the optical fibers generally depend on the wavelength of an optical signal to be transmitted through the optical coupling and on the properties of the optical fibers. The first and second optical fibers are then aligned to permit transmission of the optical signal between the ends of the optical fibers. The alignment of the first and second optical fibers is such that the optical signal escaping at the breaks in one or both of the optical fibers interferes with the optical signal escaping between the ends of the optical fibers. An active alignment process can measure the power coupled into the receiving optical fiber and position the optical fibers to minimize power loss.

Several methods for treating the optical fibers are available. The treatment generally changes a refractive index of the fiber core or cladding in regions corresponding to the breaks. One such treatment technique irradiates an optical fiber with a laser to change a refractive index of the optical fiber in the breaks. Another treatment technique removes cladding from one or more portions of an optical fiber and fills the resulting space with a material having a refractive index that differs from a refractive index of the cladding (e.g., material having the same refractive index as the core of the optical fiber.)

BRIEF DESCRIPTION OF THE DRAWINGS

Use of the same reference symbols in different figures indicates similar or identical items.

DETAILED DESCRIPTION

In accordance with an aspect of the invention, forming a pattern of breaks, cuts, or marks in a receiving optical fiber and/or a transmitting optical fiber can reduce optical power loss at a fiber-to-fiber junction. Generally, the discontinuity between the end of one optical fiber and the start of the next fiber activates secondary transmission modes. The secondary transmission modes are not viable for long distances but may travel a short distance in the cladding of the receiving optical fiber. The pattern of breaks provides other sources of signal leakage and results in interference between different modes of a light signal propagating along the optical fibers, and the interference can channel the optical power that would otherwise escape at the junction back into the core of the receiving fiber.

Figure 1A:
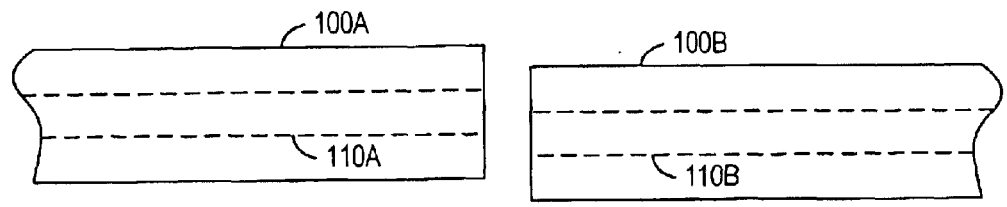
FIGS. 1A, 1B, 1C, 1D, 1E, 1F, and 1G illustrate causes of optical power loss at a fiber-to-fiber coupling.
Figure 1B:
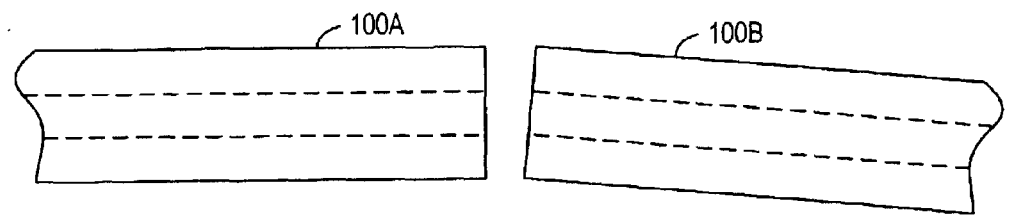
Figure 1C:
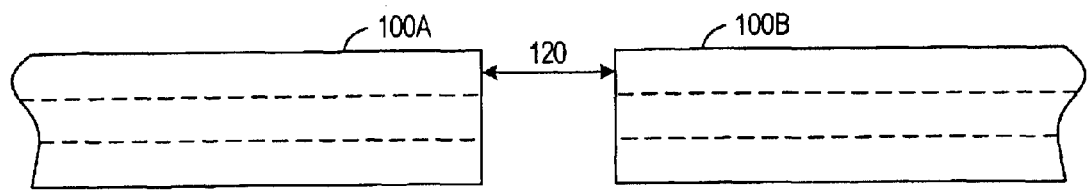
Figure 1D:
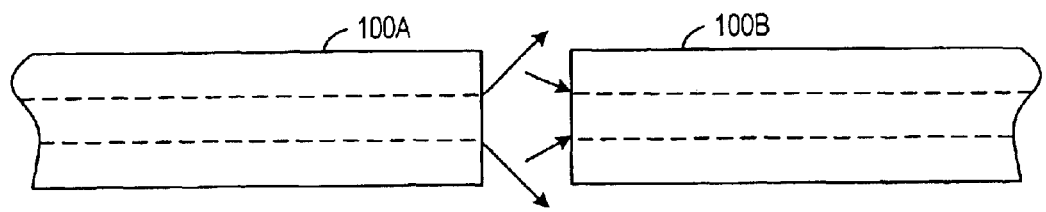
Figure 1E:
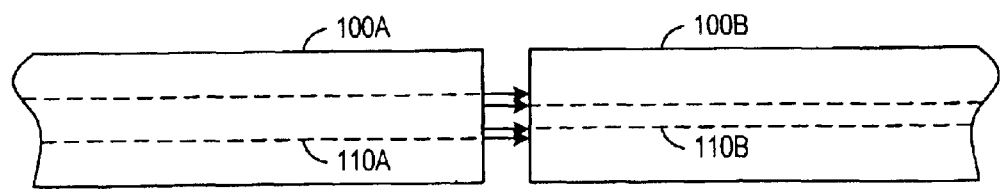
Figure 1F:
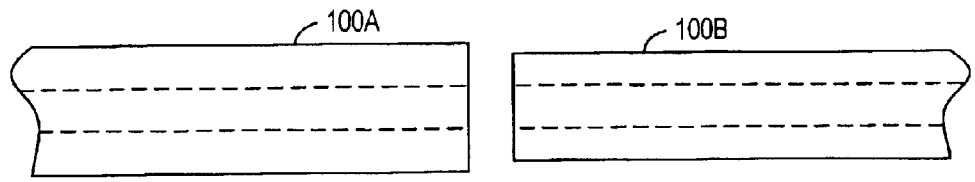
Figure 1G:
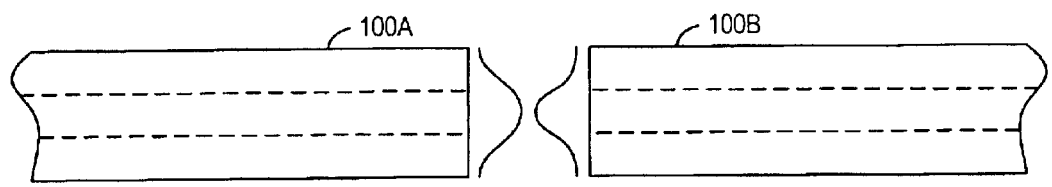
Figure 2:
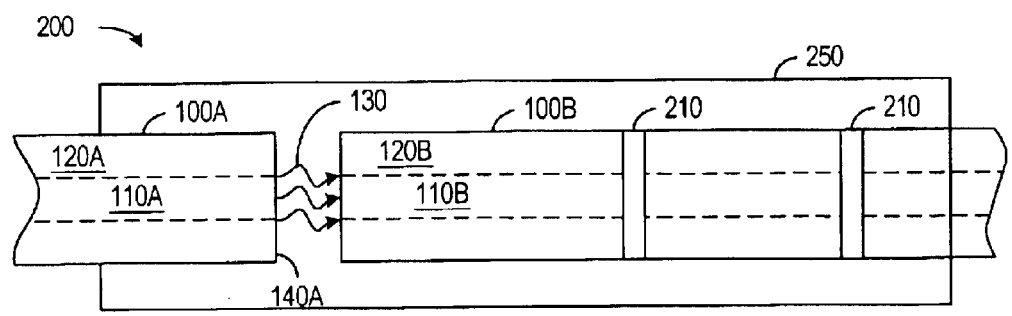
FIG. 2 illustrates an embodiment of the invention having breaks in a receiving fiber to create destructive interference that results in the recapture of power lost at a fiber-to-fiber junction.

FIG. 2 illustrates an embodiment of an optical coupling 200 in accordance with an embodiment of the invention. Optical coupling 200 joins optical fibers 100A and 100B, which include respective cores 110A and 110B and surrounding cladding 120A and 120B. Optical fibers 100A and 100B can be of any desired type capable of carrying an optical signal 130. A physical coupling device such as a sleeve 250 holds optical fibers 100A and 100B in the proper alignment for use in a system.

In optical fiber 100A, optical signal 130 has one or more propagation modes along core 110A, where the propagation mode depends on the design of optical fiber 100A, e.g., according to whether optical fiber 100A is a single mode fiber for the wavelength of light used in optical signal 130. At the end 140A of optical fiber 110A, optical signal 130 exits optical fiber 100A and enters optical fiber 100B, but the differences between optical fibers 100A and 110B and other sources of power loss described above with reference to FIGS. 1A to 1G couple some of the power from the optical signal into the secondary propagation modes of optical fiber 100B. The secondary modes generally include propagation modes of light in cladding 120B of optical fiber 100B, and for a conventional optical fiber coupling, the power coupled into such secondary modes is lost.

Optical coupling 200 includes breaks 210 in optical fiber 100B to recapture (or avoid the loss of) optical power normally coupled into the secondary propagation modes at end 140A of optical fiber 100A. Breaks 210 can be actual breaks in optical fiber 100B or merely regions of changed refractive index in cladding 120B and/or core 110B. In particular, the refractive index of core 110B can be changed in breaks 210 to match the refractive index of cladding 120B, or the refractive index of cladding 120B can be changed in breaks 210 to match the refractive index of core 110B.

Breaks 210 couple power from optical signal 130 into the secondary propagation modes of optical fiber 100B. However, in accordance with an aspect of the invention, the locations of breaks 210 are chosen so that the light coupled into the secondary modes from breaks 210 in optical fiber 100B constructively (or destructively) interferes with the light coupled into the secondary modes at end 140A. As a result of the interference, less signal power is lost through the secondary modes, thereby reducing the total power loss in coupling 200.

The size and locations of breaks 210 in optical fiber 110 generally depend on the carrier wavelength of light in optical signal 130, the optical and geometric characteristics of optical fibers 100A and 100B, and the alignment and separation of optical fibers 100A and 100B. The spacing and number of periodic breaks can be determined using a beam propagation method and/or a coupled mode analysis. Such analysis methods are known in the art and described in "Quantum Electronics" Yariv (1989), U.S. patent application Ser. No. 10/027,498, entitled "A Method and Apparatus for Reducing Optical Insertion Loss in Planar Lightwave Circuits Through Dielectric Perturbation Optimization" and Venkatesh et al., "Insertion Loss Reduction by Optimization of Waveguide Perturbations", OFC 2002 Postdeadline Papers, FA4-1-FA4-3 (2002) further describe use of such analysis for reducing insertion loss in planar lightwave circuits (PLCs). Since these analysis methods are generally approximations, some experimental trial and error will normally be required to determine the ideal spacing for a particular configuration.

Figure 3:
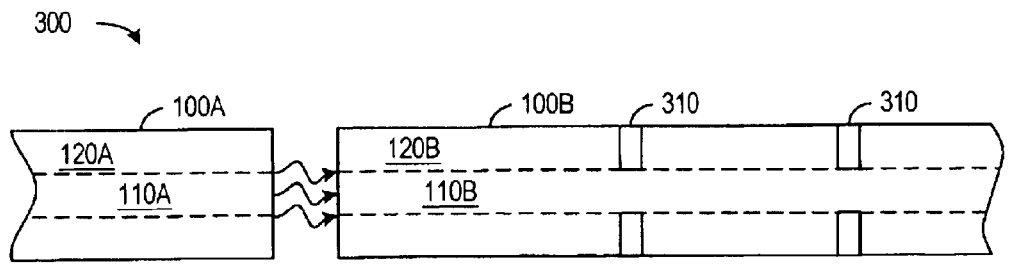
FIG. 3 illustrates an embodiment of the invention having breaks in just the cladding of a receiving fiber to create destructive interference that results in the recapture of power lost at a fiber-to-fiber junction.
Figure 4:
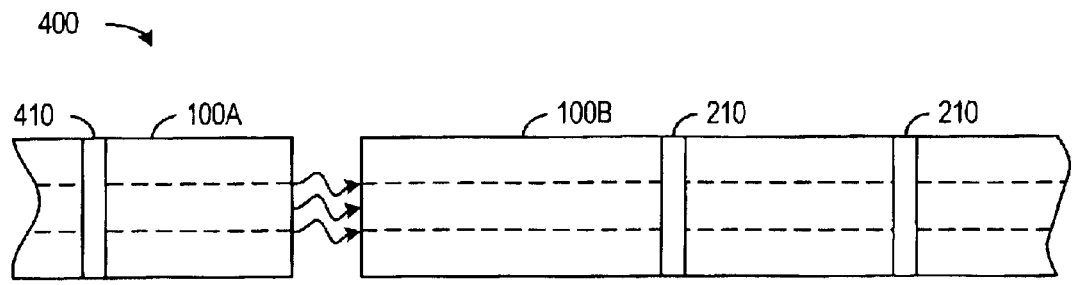
FIG. 4 illustrates an embodiment of the invention having breaks in transmitting and receiving optical fibers to create interference that reduces power lost at a fiber-to-fiber coupling.
Figure 5:
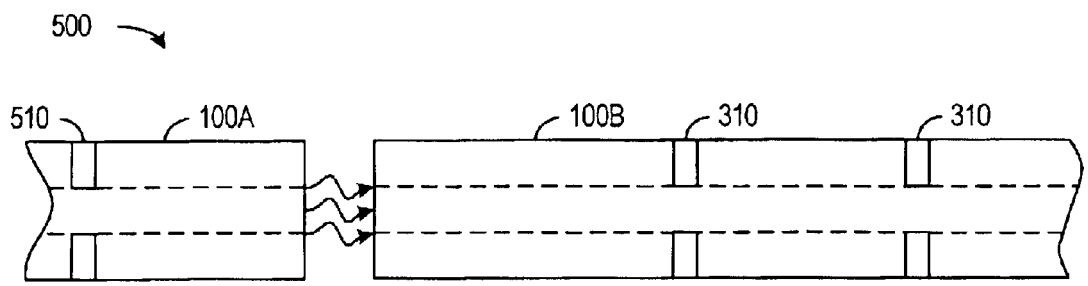
FIG. 5 illustrates an embodiment of the invention having breaks in the cladding of transmitting and receiving optical fibers to create interference that reduces the power loss at a fiber-to-fiber coupling.

The interference that reduces the power loss of a fiber coupling can be achieved in a variety of ways. FIG. 3, for example, illustrates an embodiment of the invention having breaks 310 that are confined to the cladding 120B of optical fiber 100B. FIGS. 4 and 5 illustrate that breaks 410 or 510 can also be introduced into cladding 120A and/or core 110A of the transmitting optical fiber 100A in addition to or in place of breaks 210 or 310 in the receiving optical fiber 100B.

Figure 6:
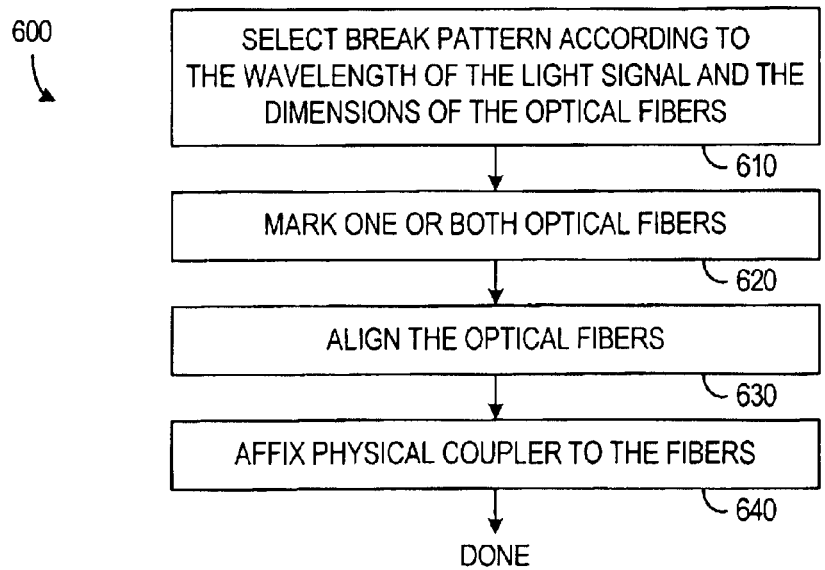
FIG. 6 is a flow chart of a fiber-to-fiber coupling process in accordance with an embodiment of the invention.

FIG. 6 is a flow diagram of a coupling process 600 for optical fibers. For coupling process 600, an initial step 610 selects a pattern for breaks in the optical fibers being joined. Selection of whether the break pattern changes the core and/or cladding of the receiving optical fiber and/or the transmitting optical fiber may depend on the technique used to create the breaks. As noted above, the pattern of breaks will generally depend on the wavelength of light in the optical signal and the optical and geometric characteristics of optical fibers being joined and can be optimized for a particular alignment and separation of the optical fibers.

Step 620 marks, cuts, or otherwise treats one or both of the optical fibers to create the selected break pattern. The end of one or both of the optical fibers thus includes one or more breaks carefully placed as required to cause the constructive (or destructive) interference that will reduce power loss. One technique for forming the breaks uses an ultraviolet laser similar to those used to write optical fiber gratings. Such lasers can create discontinuities at precise locations in a fiber. Ideally, the discontinuities have the same refractive index for the cladding and the core. Alternatively, the refractive index of the cladding in breaks may be changed, for example, by removing a section of cladding without disturbing the fiber core, and then filling the removed section of cladding with a material matching the refractive index of the core. An advantage of having breaks that only affect the cladding is the lower level of defects in the core. Such defects could scatter light at the break points, causing power loss.

Once the optical fibers are treated to create the desired break pattern, the two optical fibers are aligned in step 630.

Preferably, an active alignment process adjusts the alignment and separation of optical fibers while measuring the amount of optical power coupled into the receiving optical. Commercially available systems such as a 17 FCM 301 3-Axis Fiber-to-Fiber Coupling System from Melles Griot can be used to scan the relative position and orientation of the optical fibers while observing a power meter to detect maxima in the power coupling efficiency. An active alignment thus finds the orientation and separation of the optical fibers that minimizes power loss.

After the optimal orientation and separation are found, step 640 attaches a physical coupling device that attaches the two optical fibers and holds the optical fibers in the optimal alignment. Any type of conventional coupling device that can hold the optical fibers in alignment for use can be employed.

Although the invention has been described with reference to particular embodiments, the description is only an example of the invention's application and should not be taken as a limitation. In particular, although embodiments have been described primarily for butt-coupling of optical fibers, other embodiments of the invention can include optical fibers with breaks to utilizes interference-induced reduction in power loss in fiber-to-fiber couplings having intervening optical elements between the fibers being coupled. Various other adaptations and combinations of features of the embodiments disclosed are within the scope of the invention as defined by the following claims.

What is claimed is:

1. An optical device comprising:

a first optical fiber; and a second optical fiber having an end adjacent to an end of the first optical fiber, the second optical fiber being positioned to receive an optical signal from the first optical fiber, wherein one of the first and second optical fibers includes one or more breaks that are positioned so that the optical signal escaping from the breaks interferes with the optical signal escaping at the end of the first optical fiber, and resulting interference reduces power loss at end of the first optical fiber.

2. The device of claim 1, wherein each break comprises a change in refractive index in a core of the optical fiber containing the break.

3. The device of claim 1, wherein each break comprises a change in refractive index in cladding of the optical fiber containing the break.

4. The device of claim 1, wherein the breaks are in the first optical fiber.

5. The device of claim 1, wherein the breaks are in the second optical fiber.

6. The device of claim 1, wherein each of the first and second optical fibers contains one or more breaks that are positioned so that the optical signal escaping from the breaks interferes with the optical signal escaping at the end of the first optical fiber.

7. A process for coupling optical fibers, comprising:

treating a first optical fiber to create one or more breaks in the first optical fiber near an end of the first optical fiber;

aligning the first optical fiber and a second optical fiber to permit transmission of an optical signal between ends of the first and second optical fibers, wherein alignment of the first and second optical fibers is such that the optical signal escaping at the breaks in the first optical fiber interferes with the optical signal escaping between the ends of the first and second optical fibers, and resulting interference improves coupling efficiency of the first and second optical fibers.

8. The process of claim 7, wherein treating the first optical fiber comprises irradiating the first optical fiber with a laser to change a refractive index of the first optical fiber in regions corresponding to the breaks.

9. The process of claim 7, wherein treating the optical fiber changes a refractive index of a core of the first optical fiber in regions corresponding to the breaks.

10. The process of claim 7, wherein treating the optical fiber changes a refractive index of cladding of the first optical fiber in regions corresponding to the breaks.

11. The process of claim 7, wherein treating the first optical fiber comprises:

removing cladding from one or more portion of the first optical fiber; and filling space resulting from removal of the cladding with a material having a refractive index that differs from a refractive index of the cladding.

12. The process of claim 11, wherein the refractive index of the material matches a refractive index of a core of the first optical fiber.

13. The process of claim 7, further comprising treating the second optical fiber to create one or more breaks in the second optical fiber.

14. The process of claim 7, wherein the aligning of the first and second optical fibers is after the treating of the first optical fiber.

15. The process of claim 14, wherein the aligning of the first and second optical fibers comprises measuring power coupled into a receiving one of the first and second optical fibers and adjusting the position and orientation of the first and second optical fibers to maximize the power measured.

* * * * *